(12) United States Patent
Liu et al.

(10) Patent No.: US 11,487,542 B2
(45) Date of Patent: Nov. 1, 2022

(54) INSTRUCTION CACHE BEHAVIOR AND BRANCH PREDICTION

(71) Applicant: International Business Machines Corporation, Armonk, NY (US)

(72) Inventors: Yang Liu, Shanghai (CN); Ting Wang, Shanghai (CN); Qi Li, Beijing (CN); Qing Zhang, Shanghai (CN); Gui Haochen, Shanghai (CN); Xiao Ping Guo, Shanghai (CN); Xiao Hua Zeng, Shanghai (CN); Yangming Wang, Shanghai (CN); Yi Li, Shanghai (CN); Hua Qing Li, Shanghai (CN); Fei Fei, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/933,197

(22) Filed: Jul. 20, 2020

(65) Prior Publication Data

US 2022/0019435 A1    Jan. 20, 2022

(51) Int. Cl.
  *G06F 15/00*    (2006.01)
  *G06F 7/38*    (2006.01)
  *G06F 9/44*    (2018.01)
  *G06F 9/00*    (2006.01)
  *G06F 9/30*    (2018.01)
  *G06F 12/0875*    (2016.01)

(52) U.S. Cl.
  CPC ...... *G06F 9/30058* (2013.01); *G06F 12/0875* (2013.01); *G06F 2212/452* (2013.01)

(58) Field of Classification Search
  CPC .......... G06F 9/30058; G06F 12/0875
  USPC .......... 712/234
  See application file for complete search history.

(56) References Cited

U.S. PATENT DOCUMENTS

| | | | | |
|---|---|---|---|---|
| 5,790,822 A | * | 8/1998 | Sheaffer | G06F 9/3853 712/216 |
| 6,367,001 B1 | * | 4/2002 | Witt | G06F 9/30021 712/205 |
| 9,250,937 B1 | | 2/2016 | Franz et al. | |
| 2002/0087793 A1 | * | 7/2002 | Samra | G06F 9/3885 712/E9.055 |

(Continued)

OTHER PUBLICATIONS

Profile-Guided Optimization (PGO), Intel C++ Compiler 19.0 Developer Guide and Reference, viewed Jul. 1, 2020 https://software.intel.com/content/www/us/en/develop/documentation/cpp-compiler-developer-guide-and-reference/top/optimization-and-programming-guide/profile-guided-optimization-pgo.html.

(Continued)

*Primary Examiner* — Chun Kuan Lee
(74) *Attorney, Agent, or Firm* — Patterson + Sheridan, LLP

(57) ABSTRACT

Instruction cache behavior and branch prediction are used to improve the functionality of a computing device by profiling branching instructions in an instruction cache to identify likelihoods of proceeding to a plurality of targets from the branching instructions; identifying a hot path in the instruction cache based on the identified likelihoods; and rearranging the plurality of targets relative to one another and associated branching instructions so that a first branching instruction that has a higher likelihood of proceeding to a first hot target than to a first cold target and that previously flowed to the first cold target and jumped to the first hot target instead flows to the first hot target and jumps to the first cold target.

18 Claims, 10 Drawing Sheets

(56) References Cited

U.S. PATENT DOCUMENTS

| | | | |
|---|---|---|---|
| 2015/0149984 A1* | 5/2015 | Gooding | G06F 11/3656 717/128 |
| 2015/0356294 A1 | 12/2015 | Tan et al. | |
| 2017/0371635 A1 | 12/2017 | Davidson et al. | |
| 2019/0042760 A1 | 2/2019 | Gutson et al. | |

OTHER PUBLICATIONS

"Profile-Guided Optimization", Wikipedia, viewed Jul. 1, 2020 https://en.wikipedia.org/wiki/Profile-guided_optimization.

* cited by examiner

INSTRUCTION CACHE BEHAVIOR AND BRANCH PREDICTION

BACKGROUND

The present invention relates to instruction caches, and more specifically, to how instructions are organized in the instruction caches in relation to branching instructions in the instruction path. When executing instructions in an instruction cache, having each instruction flow to the next address in the instruction cache is more efficient than jumping to a remote location in the instruction cache. Branching instructions add flexibility to the code, allowing the code to flow to a next instruction held at a subsequent address in the instruction cache, or jump to a different address in the instruction cache to execute a different instruction. However, jumping to a remote address can decrease the efficiency of executing code in the instruction cache, particularly when data (e.g., values for variables) are pre-cached for execution and need to be discarded (if not needed) or pulled from memory (if the remote destination is outside of the pre-caching window).

SUMMARY

According to one embodiment of the present invention, a computer-implemented method is provided that comprises: identifying a branching instruction associated with: an origin instruction; a cold target; and a hot target located after the cold target in an instruction cache, wherein, based on historical data, the branching instruction is more likely to proceed to the hot target than to the cold target at execution based on a routing condition; swapping an order of the cold target and the hot target in the instruction cache; and reversing the routing condition.

According to one embodiment of the present invention, a computer-implemented method is provided that comprises: identifying a branching instruction associated with: a cold block starting with a cold target that the branching instruction flows to when a routing condition is a first one of true or false; and a hot block located before the branching instruction in an instruction cache that starts at a hot target that flows to a subsequent instruction and that the branching instruction jumps to when the routing condition is a second one of true or false, wherein, based on historical data, the branching instruction is more likely to proceed to the hot target than to the cold target at execution; inserting a space between the branching instruction and the cold target; inserting a duplicate hot block and a jump instruction in the space, wherein the duplicate hot block flows to the jump instruction and the jump instruction jumps to the subsequent instruction; and reversing the routing condition in the branching instruction to flow to the duplicate hot block when the routing condition is the second one of true or false and to jump to the cold target when the routing condition is the first one of true or false According to one embodiment of the present invention, a computer-implemented method is provided that comprises profiling branching instructions in an instruction cache to identify likelihoods of proceeding to a plurality of targets from the branching instructions; identifying a hot path in the instruction cache based on the identified likelihoods; and rearranging the plurality of targets relative to one another and associated branching instructions so that a first branching instruction that has a higher likelihood of proceeding to a first hot target than to a first cold target and that previously flowed to the first cold target and jumped to the first hot target instead flows to the first hot target and jumps to the first cold target.

According to one embodiment of the present invention, a system is provided, the system comprising: a processor, including an instruction cache; a memory including instructions that when executed by the processor perform an operation comprising: profiling branching instructions in the instruction cache to identify likelihoods of proceeding to a plurality of targets from the branching instructions; identifying a hot path in the instruction cache based on the identified likelihoods; and rearranging the plurality of targets relative to one another and associated branching instructions so that a first branching instruction that has a higher likelihood of proceeding to a first hot target than to a first cold target and that previously flowed to the first cold target and jumped to the first hot target instead flows to the first hot target and jumps to the first cold target.

According to one embodiment of the present invention, a computer-readable storage medium having computer-readable program code embodied therewith is provided, the computer-readable program code executable by one or more computer processors to: profile branching instructions in an instruction cache to identify likelihoods of proceeding to a plurality of targets from the branching instructions; identify a hot path in the instruction cache based on the identified likelihoods; and rearrange the plurality of targets relative to one another and associated branching instructions so that a first branching instruction that has a higher likelihood of proceeding to a first hot target than to a first cold target and that previously flowed to the first cold target and jumped to the first hot target instead flows to the first hot target and jumps to the first cold target.

DETAILED DESCRIPTION

Figure 1:
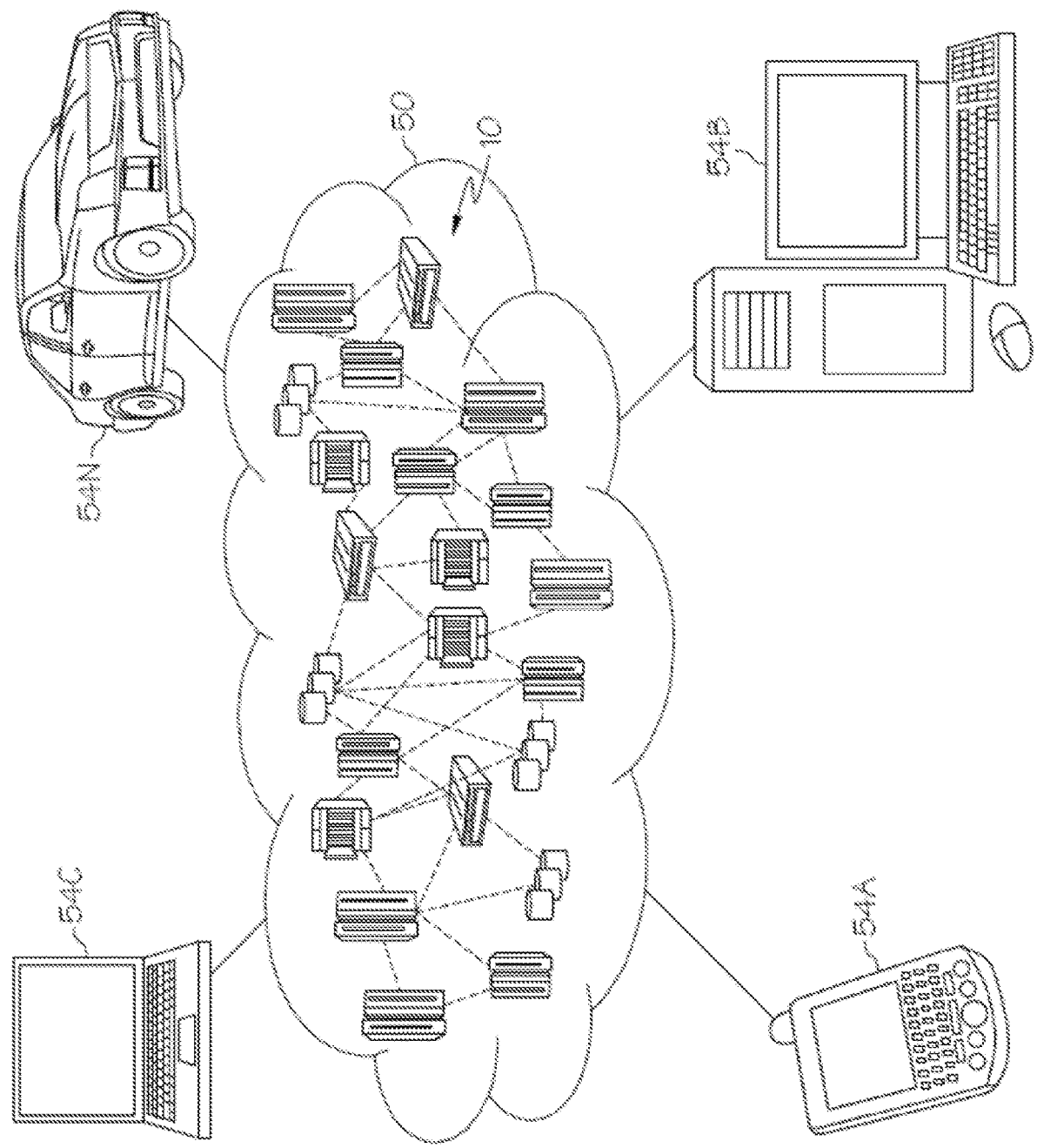
FIG. 1 depicts a cloud computing environment, according to embodiments of the present disclosure.

The present disclosure provides for improvements to the operational efficiency of executing code from an instruction cache by reducing the number of jumps to remote targets taken when executing the code from the instruction cache. By reducing the number of jumps, the code is able to flow more often from a given address in the instruction cache to a subsequent address, which allows for more reliable and faster pre-caching of data among other benefits. To reduce the number of jumps taken when executing the code, a sorting function rearranges the code held in the instruction cache so that the branching instructions flow to the most-likely branch and jump to the least-likely branch. This sorting function allows for the code to be manipulated when undergoing Just-in-Time (JIT) compilation (e.g., when the class files and source code are compiled at runtime) to tune the operating performance of the code.

JIT compilers can be used to improve the functionality and efficiency of portions of code or functions that are frequently called and executed by one or more processors. Generally, JIT compilers are divided into two modes or classes: class 1 (C1) and class 2 (C2) compilers. The C1 and C2 compilers use different techniques for compiling code, and can output different machine level instructions for the same methods/base code with different advantages for each class. In some embodiments, both C1 and C2 compilers are used in a tiered compilation, where the C1 compiler is used to provide quick startup performance for an initial iteration of the base code, and the C2 compiler is used to improve the efficiency of the code. The C2 compiler produces a C2 instruction set, which includes constants, instructions, stubs, exception handlers, and the like. In one embodiment, the sorting function directly manipulates the C2 instruction set without changing any of the underlying logic or requiring a re-compilation.

JIT programming languages are widely used in "Big Data" and cloud computing environments, such as in Java Virtual Machines (JVM), but can also be used in dedicated servers or personal computing devices and in a variety of programming languages. Accordingly, although the examples given herein may be provided with reference to, or in the style of a given programming language or operating environment, the present disclosure may be applied with using various programming languages in various operating environments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
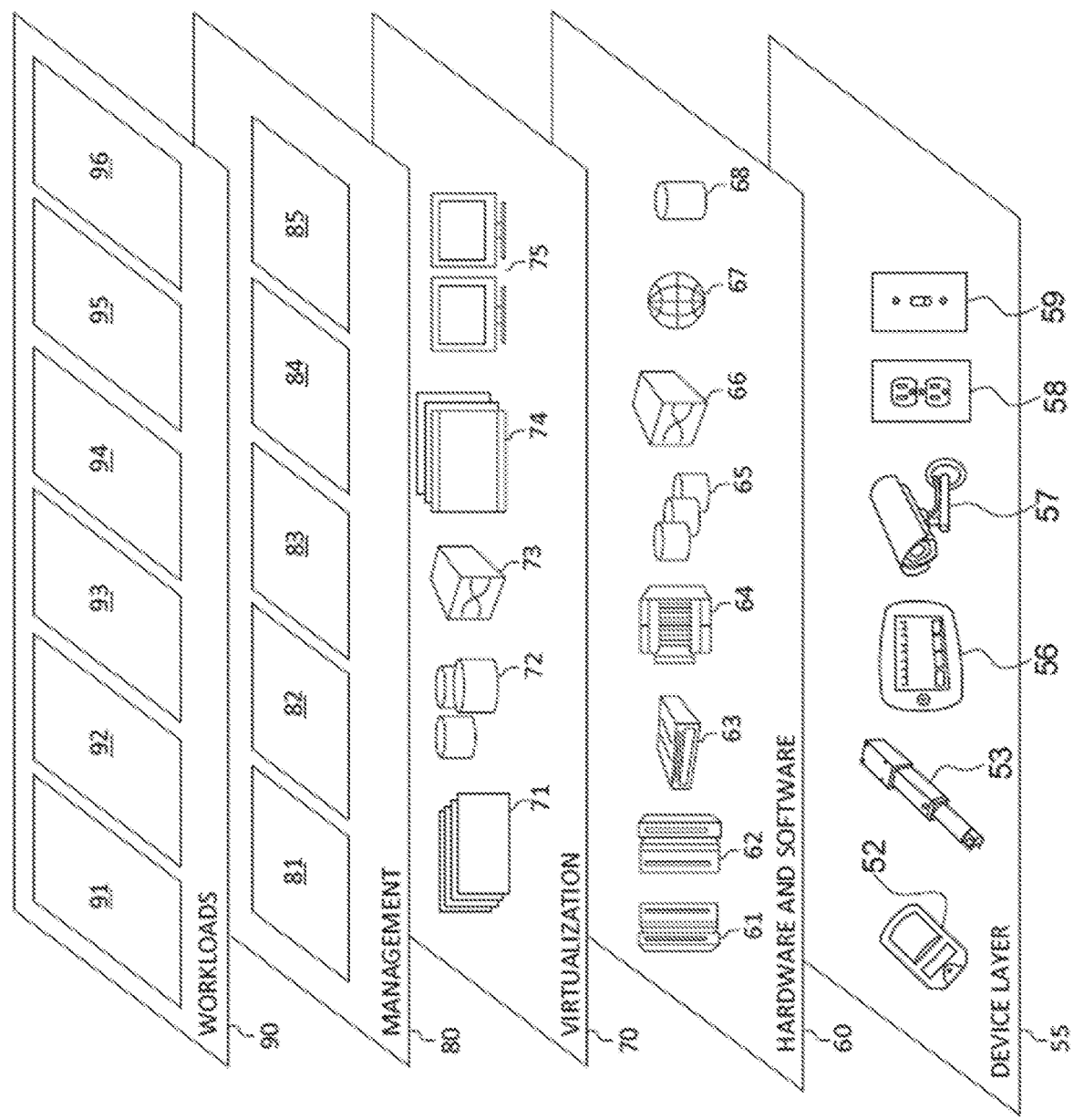
FIG. 2 depicts abstraction model layers, according to embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and class balancing training datasets for intent authoring using search 96.

Figure 3A:
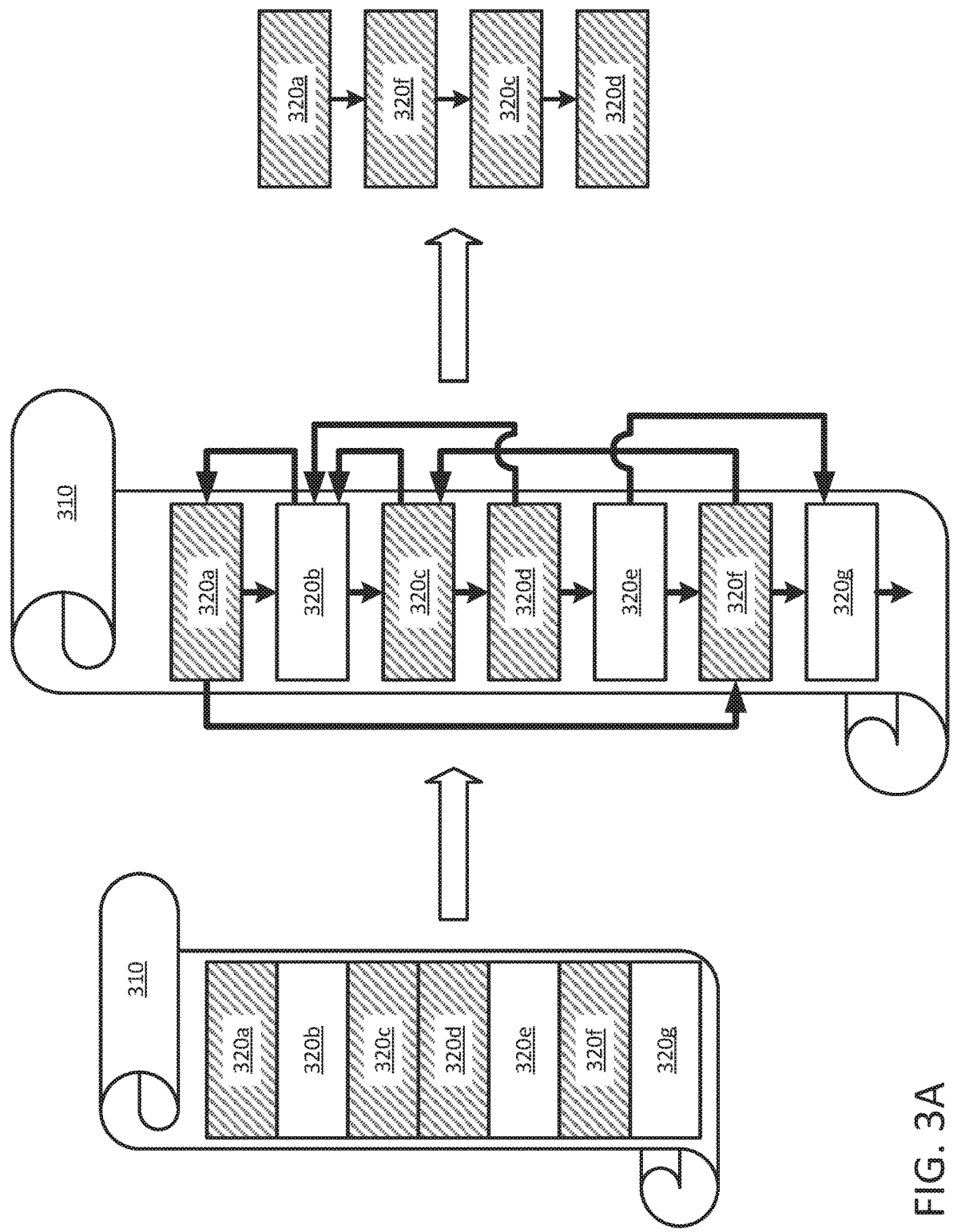
FIGS. 3A and 3B illustrate implementations of via branch prediction to rearrange an instruction cache, according to embodiments of the present disclosure.
Figure 3B:
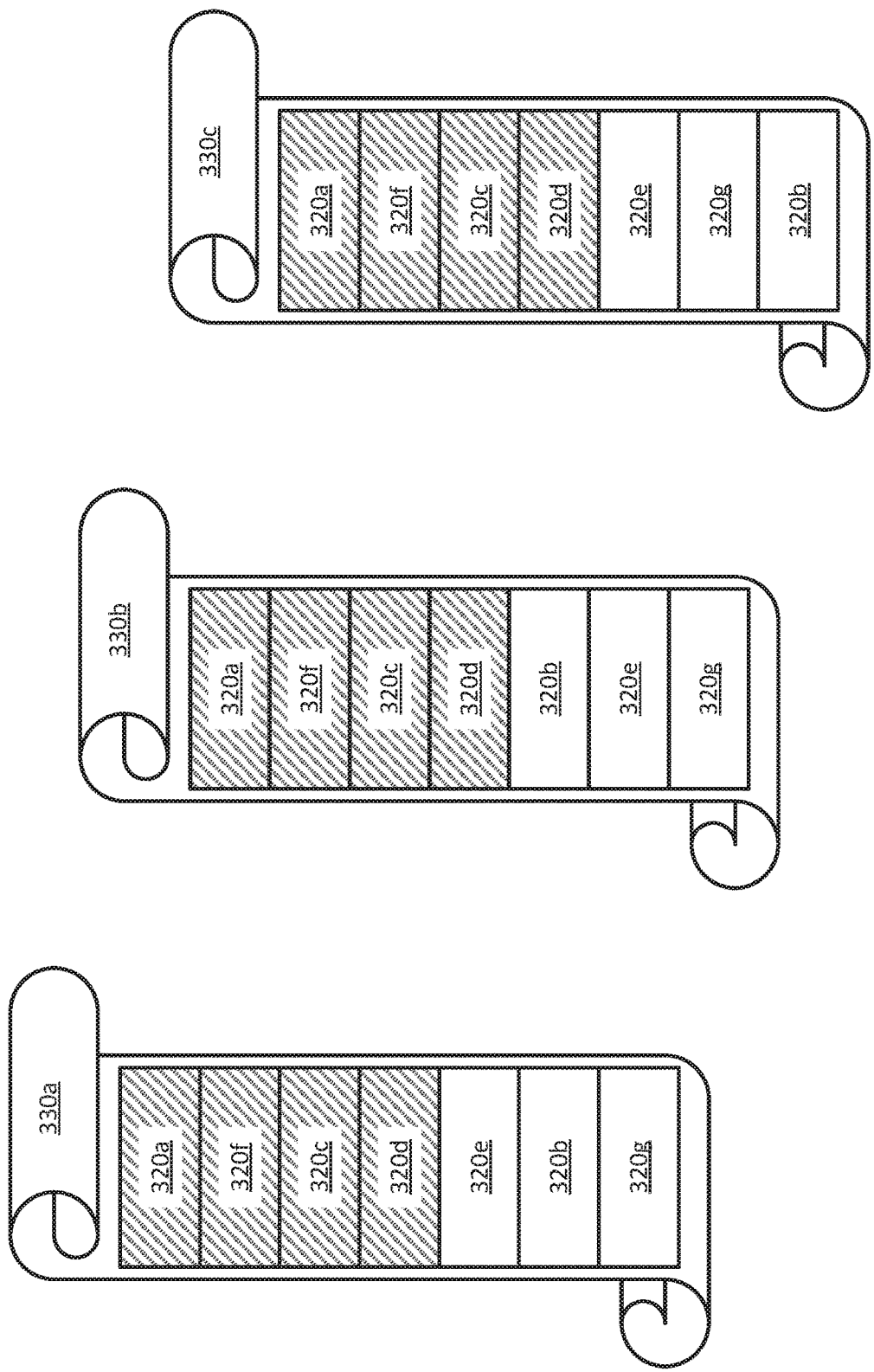
Figure 4:
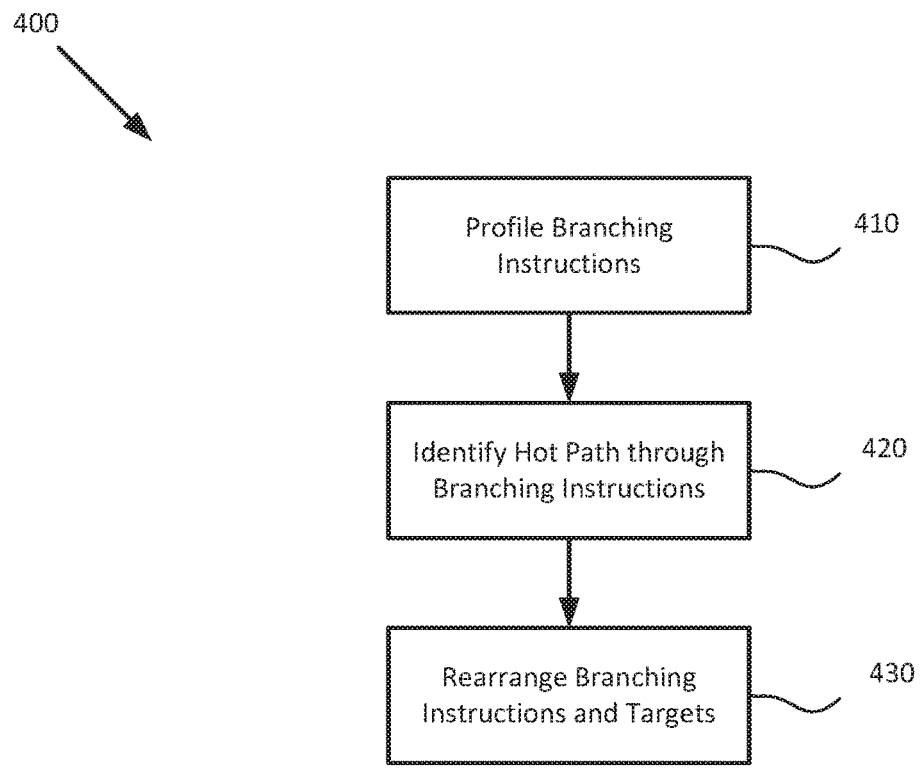
FIG. 4 is a flowchart of a method of rearranging an instruction cache based on branch prediction, according to embodiments of the present disclosure.

FIGS. 3A and 3B illustrate implementations of a method 400, shown as a flowchart in FIG. 4, for acting on an instruction cache to improve instruction cache behavior via branch prediction, according to embodiments of the present disclosure.

When the high-level code for a function or method is compiled and readied for execution by a processor as machine level instructions, a set of those machine level instructions are loaded into the instruction cache for the processor. The instruction cache provides fast access to the instructions, so that the processor does not have to access a slower off-processor memory device (e.g., Random Access Memory (RAM), hard drives, etc.) located remotely from the processor to load the instructions and perform the specified function. However, the size of the instruction cache is relatively small compared to off-processor memory devices, and which instructions are loaded into the instruction cache is an important consideration so that the processor has the next portion of data readily available when that portion of data is needed. If the instruction cache does not include the next portion of data needed for execution, the processor attempts to locate the data elsewhere (e.g., in off-processor RAM, in a different on-processor cache). In various embodiments, a cache controller determines what instructions are loaded into the instruction cache and what order those instructions are arranged in the instruction cache.

Method 400 begins at block 410, where a sorting function performed by the cache controller profiles the branching instructions in an instruction cache. Profiling the branching instructions occurs over several execution iterations of the instructions and identifies the likelihoods, based on past observations, that a given branch instruction proceeds to a first target or a second target of the given branch instruction. In other words, whether the branch is taken or not.

When profiling the instructions, the sorting function divides the initial C2 instruction set 310 (e.g., the set of machine level code instructions and related metadata loaded into the instruction cache to perform a function or operation in a program) into several code blocks 320a-g (generally or collectively, code block 320). Although seven code blocks 320a-g are illustrated in FIG. 3A, it will be appreciated that an initial C2 instruction set 310 can be divided into more or fewer code blocks 320. Each code block 320 can represent a predefined number of bits or instructions lines, or can represent a set of instructions that are performed without jumping to a remote address in the instruction cache (e.g., performing instructions stored at address X and then executing the instruction stored at address X+1). For example, each code block 320 can end with a branching instruction. The address in the instruction cache that a branching instruction flows to or jumps to in a different code block 320 is referred to herein as a target. Each code block 320 can include several instructions between the initial target and a branching instruction or bit limit that ends the code block 320.

As used herein, when a program executes a series of instructions held in sequential addresses in the instruction cache, that program is said to flow over that sequence. In contrast, when the program is described herein as 'jumping', the program performs an instruction that is located at a remote address from the immediately prior instruction in the instruction cache. In various embodiments, the program can jump ahead in the instruction cache (e.g., performing the instruction stored at address X and then executing the instruction stored at address X+Y, where Y>1) or can jump backward in the instruction cache (e.g., performing the instruction stored at address X and then executing the instruction stored at address X−Y, where Y>1).

A branching instruction determines whether to flow to a next address or jump to a remote address based on a routing condition. For example, a branching instruction of an IF/ELSE statement can flow to the next address when the routing condition if true and jump to the remote address when the routing condition is false. In another example, a branching instruction of a GOTO statement that always jumps to a remote address and may omit a routing condition or be a branching instruction where the routing condition is always satisfied.

At block 420, the sorting function identifies a hot path 330 through the branching instructions. Over several executions of the initial C2 instruction set 310, the sorting function creates an trace index of the different branching instructions that identifies how often each branch flows to a next address or jumps to a remote address. For example, by adding an indexed trace point behind each branch instruction in the instruction cache, the sorting function identifies which code blocks 320 jump or flow to which other code blocks 320. The hot path 330 identified in the code blocks 320 identifies the most-likely path for an execution of the instructions to follow, based on past observations of the instructions. Stated differently, historical data from prior executions of the C2 instruction set 310 are used to determine which branches are "hot" or "cold" and a sequence of "hot" branches describe the hot path 330 through the branching instructions.

For example, a branching instruction in a first code block 320a can proceed to one of the second code block 320b or the sixth code block 320f. When the first code block 320a is observed proceeding to the sixth code block 320f more often than proceeding to the second code block 320b, the sorting function identifies the sixth code block 320f as being a "hot block" and identifies the second code block 320b as being a "cold block" relative to one another. Similarly, the sixth code block 320f can proceed to one of the seventh code block 320g or the fourth code block 320d, and the sorting function observes which branch the sixth code block 320f proceeds to most often. The sorting function can observe each of the branching pathways to identify the most likely path (i.e., the hot path 330) that execution of the instructions will follow through execution of the instructions.

In various embodiments, the sorting function may decline to designate one branch the hot branch and the other the cold branch based on various threshold including differential thresholds and experience thresholds. For example, the fifth code block 320e may proceed to the sixth code block 320f X % of the time and to the seventh code block 320g Y % of the time where X>Y; however, when Δ(X, Y) is less than a differential threshold (e.g., when X=51 and Y=49), neither branch is designated as a hot block or a cold block. In another example, the fifth code block 320e may proceed to the sixth code block 320f X % of the time and to the seventh code block 320g Y % of the time where X>Y and where Δ(X, Y) satisfies the differential threshold, but if the sorting function has not observed execution of the fifth code block 320e enough times to establish a reliable or statistically significant evaluation of whether the fifth code block 320e is more likely to proceed to the sixth code block 320f or the seventh code block 320g. These thresholds can be user defined or system defined in various embodiments.

The hot path 330 identified in block 420 identifies the execution path through the branching instructions to each of the hot code blocks. In various embodiments, such as when a given branching instruction does not have a hot block, the hot path 330 is divided into two or more segments or terminates. In some embodiments, when a hot path 330 defines a loop, the hot path 330 terminates with the given code identified as looping back to another code block 320 (as an associated hot block) that is already identified as being included in the hot path 330 to break the loop.

At block 430, and as illustrated in FIG. 3B, the sorting function rearranges the branching instructions and the associated targets in the initial C2 instruction set 310 to produce a rearranged C2 method 340a or 340b (generally, rearranged C2 method 340. As shown in FIG. 3A, the hot path includes: the first code block 320a, the sixth code block 320f (as the hot block of the first code block 320a), the third code block 320c (as the hot block of the sixth code block 320f), and the fourth code block 320d (as the hot block of the third code block 320c). The rearranged C2 method 340 takes the code blocks 320 held in the instruction cache and moves the code blocks 320 so that the code blocks 320 appear as in the identified hot path 330 rather than as initially arranged in the initial C2 method 310.

In the illustrated example of the initial C2 instruction set 310, the first code block 320a is initially stored in the instruction cache to flow to the second code block 320b and jump to the sixth code block 320f. In the illustrated examples of the rearranged C2 instruction set 340, the code blocks 320 included in the hot path 330 are moved and adjusted so that the rearranged C2 instruction set 340 orders the code blocks 320 according to the hot path 330.

Rearranging the code block 320 can include one or both of forward-branch rearrangement (per method 600 described in greater detail in regard to FIGS. 5 and 6) and backward-branch rearrangement (per method 800 described in greater detail in regard to FIGS. 7 and 8), and is an iterative process. For example, when performing block 420, the sorting function performs a first instance of methods 600 or 800, a second instance of methods 600 or 800, . . . and an nth instance of methods 600 or 800 until the C2 instruction set has been rearranged to include the hot path 330 or a processor begins executing the instructions.

Because the rearrangement of the code blocks 320 is performed just in time for execution of the instructions, in various embodiments, the rearrangement can be incomplete. For example, if the hot path includes X code blocks, but only enough time exists for X−1 iterations, the rearranged C2 instruction set 340 may include a best-effort rearrangement of the code blocks 320 so that X−1 of the X members of the hot path 330 are arranged in the rearranged C2 instruction set 340. In various embodiments, the sorting function prioritizes rearranging the code blocks 320 based on a proximity to the start of the C2 instruction set (e.g., the targets for the first code block 320 in the hot path 330 are rearranged before the targets for the second code block 320 in the hot path 330). Stated differently, in some best-effort rearrangements, an earlier code block 320 in the hot path 330 has a higher priority for rearrangement than later code blocks 320 in the hot path 330. In some embodiments, the sorting function prioritizes rearranging the code blocks 320 based on a certainty of the branching decision proceeding to the targets. Stated differently, in some best-effort rearrangements, a code block 320 with a likelihood of X for proceeding to an associated hot block has a higher priority for rearrangement than code blocks 320 that have of a likelihood less than X of proceeding to associated hot blocks.

Additionally, because the rearrangement of the code blocks 320 is performed iteratively, and can move code blocks 320 forward instruction cache, move code blocks 320 backwards in the instruction cache, and duplicate code blocks 320 in the instruction cache, the rearranged C2 instruction set 340 can take a variety of formats outside of the code blocks 320 that are members of the hot path 330. For example, a first rearranged C2 instruction set 340*a* places the fifth code block 320*e* before the second code block 320*b* and places the seventh code block 320*g* last, whereas the second rearranged C2 instruction set 340*b* places the second code block 320*b* before the fifth code block 320*e* and places the seventh code block 320*g* last. In contrast to both the first rearranged C2 instruction set 340*a* and the second rearranged C2 instruction set 340*b*, the third rearranged C2 instruction set 340*c* places the fifth code block 320*e* before the seventh code block 320*g* and places the second code block 320*b* last. As will be appreciated, the different orders of the code blocks 320 that are not part of the hot path 330 may be the result of reordering the code blocks 320 in the hot path 330 with different priorities (e.g., order from method origin versus confidence in hot/cold block determination), performing different forward and backward-rearrangement operations, and combinations thereof.

The iterative process allows for the dynamic profiling and compiling of the code blocks 320 over the whole life of execution of the code, which may be performed upwards of millions of time over a period of time. Accordingly, method 400 may be continuously performed to profile and re-profile the C2 instruction set 310 (and the rearranged C2 instruction set 340) to update determinations of which code blocks 320 are considered "hot" or "cold" (e.g., based on changes to input data to the executed function) and update the hot path 330 accordingly. Therefore, in subsequent iterations, method 400 may rearrange the code blocks 320 in new ways or return the arrangement to an earlier order to reflect the newly determined hot path 330.

Figure 5:
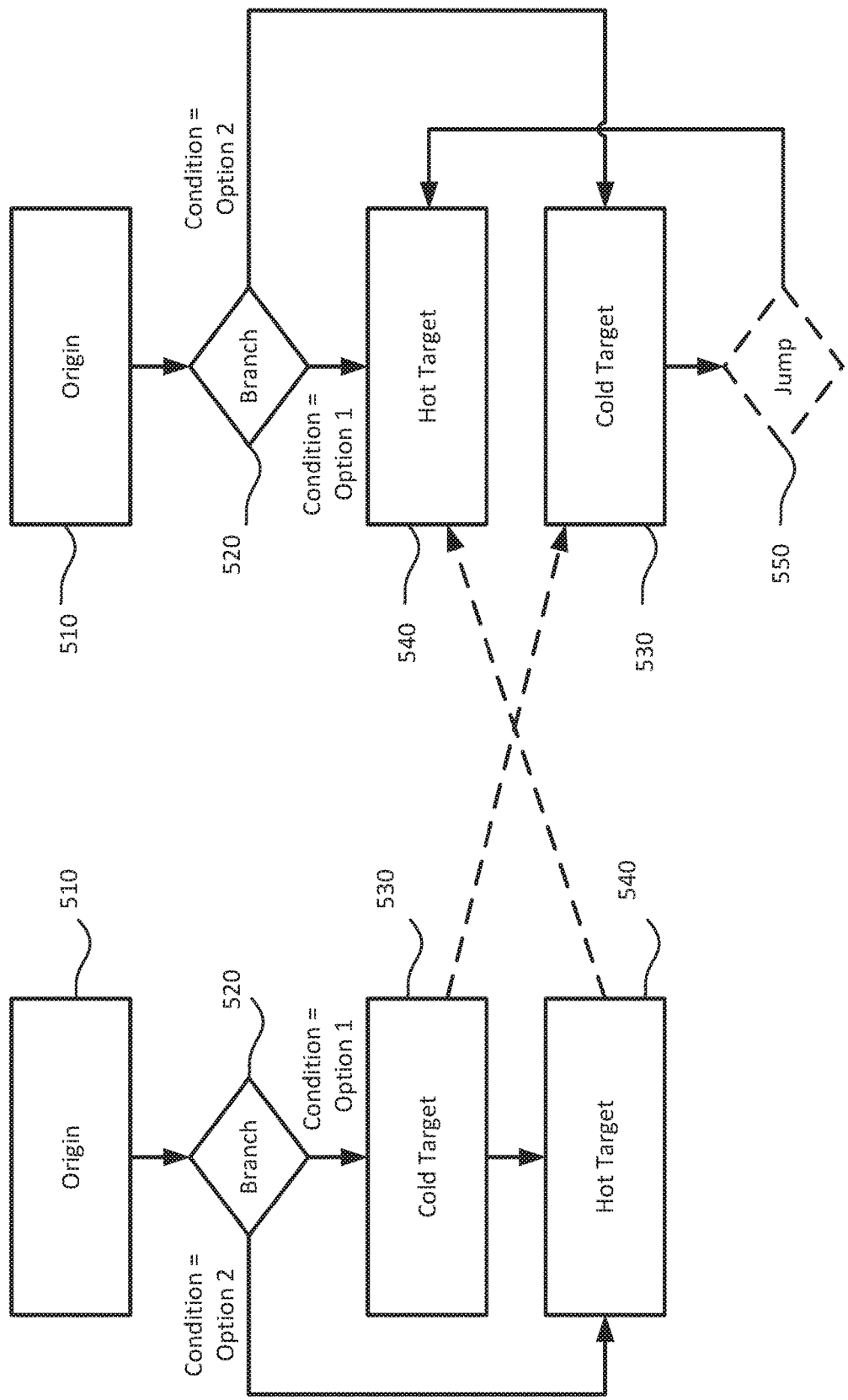
FIG. 5 illustrates forward-branch rearrangement, according to embodiments of the present disclosure.
Figure 6:
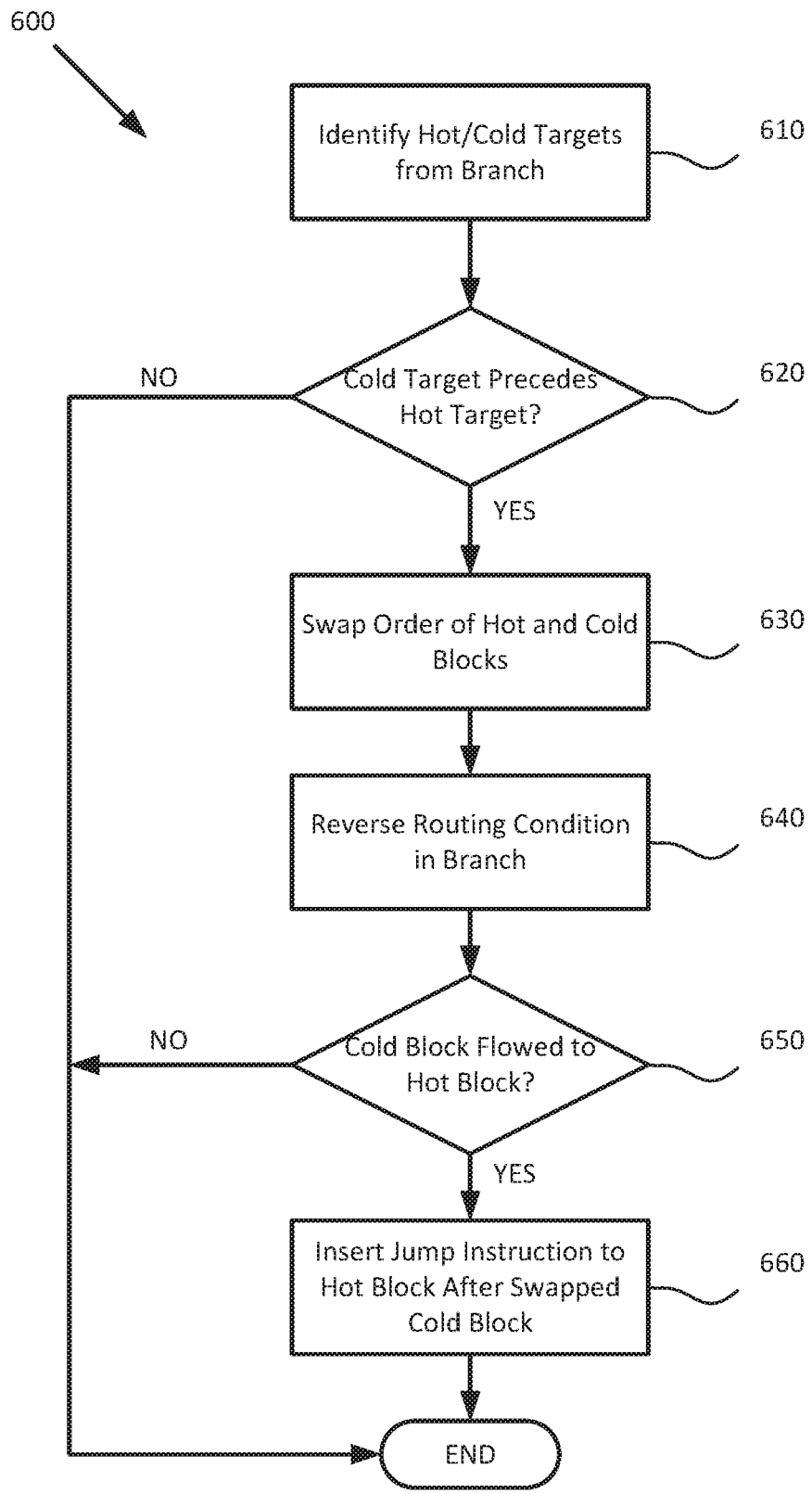
FIG. 6 is a flowchart of a method for forward-branch rearrangement, according to embodiments of the present disclosure.

FIG. 5 illustrates implementation of a method 600, shown as a flowchart in FIG. 6, for forward-branch rearrangement, according to embodiments of the present disclosure. In forward branch-rearrangement, an origin instruction 510 flows to a branching instruction 520 which branches to cold target 530 and a hot target 540 that are located after the branching instruction 520 in the instruction cache to ensure that the branching instruction 520 flows to the hot target 540 and jumps to the cold target 530 and not vice versa. In various embodiments, the origin instruction 510 and the branching instruction 520 are part of the same code block 320, which can include additional instructions that flow to the origin instruction 510, which are not illustrated in FIG. 5. Additionally, the cold target 530 and the hot target 540 represent addresses or lines in the instruction cache and can be associated with additional instructions in a code block 320 that are not illustrated in FIG. 5.

Method 600 begins at block 610, where the sorting function identifies which of the blocks targeted by a branching instruction 520 include the hot target 540 and the cold target 530. At block 620, the sorting function determines whether the cold target 530 precedes the hot target 540 in the instruction cache. When the hot target 540 precedes the cold target 530 (e.g., when the branching instruction 520 already flows to the hot target 540), method 600 may conclude. When the cold target 530 precedes the hot target 540 (e.g., when the branching instruction 520 jumps to the hot target 540), method 600 proceeds to block 630.

At block 630, the sorting function swaps the order of the hot and cold blocks that contain the respective hot target 540 and cold target 530. In one example, the order is switched by inserting the hot block where the cold block was initially located and shifting every subsequent instruction later in the instruction cache to make room for the hot block. In another example, the order is switched by inserting the hot block where the cold block was initially located and inserting the cold block where the hot block was previously located, which may result in one or more intermediate instruction blocks being located between the rearranged hot block and cold block if the cold block and the hot block originally had intermediate instruction blocks located between one another.

At block 640, the sorting function reverses the routing condition in the branching instruction so to route the execution to the newly located hot target 540 and cold target 530. For example, when the execution of the branching instruction 520 originally jumps to the hot target 540 when the routing condition is a true and originally flows to the cold target 530 when the routing condition is false, reversing the routing condition causes the branching instruction 520 to jump to the cold target 530 when the routing condition is a true and flow to the hot target 530 when the routing condition is false. Similarly, when the execution of the branching instruction 520 originally jumps to the hot target 540 when the routing condition is a false and originally flows to the cold target 530 when the routing condition is true, reversing the routing condition causes the branching instruction 520 to jump to the cold target 530 when the routing condition is a false and flow to the hot target 530 when the routing condition is true.

As will be appreciated, when the size of the hot block and the cold block are the same, the branching instruction 520 retains the original address for the hot target 540 in its jump command to jump to the swapped cold target 530. However, when the hot and cold blocks are different sizes, reversing the routing condition in the branching instruction 520 can also include updating the address that the jump command references to point to the swapped location of the cold target 530.

At block 650, the sorting function determines whether the cold block flowed to the hot block in the original arrangement. For example, when the cold block is initially located at addresses X through Y and does not conclude with a jumping instruction, and the hot block is initially located at address Y+1, the sorting function identifies that the cold block flowed to the hot block in the original arrangement. When the sorting function determines that the cold block did not flow to the hot block (e.g., an intermediate instruction block was located between the cold and hot blocks, the cold block includes a jump instruction or a second branching instruction that does not flow to the hot block), method 600 may then conclude.

When the sorting function determines that the cold block did flow to the hot block, method 600 proceeds to block 660, where the sorting function inserts a jump instruction 550 to return to the hot block. The processor can recognize the unconditional jump instruction 550 and will pre-fetch the instructions pointed to in the hot block by the jump instruction. The jump instruction 550 and pre-fetching allows the execution logic remain the same in the original and rearranged orders when the cold block relies of fall through logic. When the cold block includes a second branching instruction or an unconditional jump instruction that does not point to the hot block, block 660 may be omitted to avoid inserting an additional jump instruction 550. Any code blocks 320 initially included after the cold block are shifted to later address in the instruction cache (or dropped from the instruction cache based on memory availability and space available in the instruction cache) to make room for the new jump instruction 550. Method 600 may then conclude.

Because method 600 is performed atomically for each branching instruction 520, after an instance of method 600 concludes, the sorting function can perform method 600 again on a different branching instruction 520 with different hot and cold targets identified from the hot path 330, perform method 800 (discussed in relation to FIGS. 7 and 8) on a different branching instruction 520 with different hot and cold targets identified from the hot path 330, or may conclude. In some embodiments, the branching instruction 520 selected for a next iteration of method 600 (or an iteration of method 800) is the hot block from a current iteration of method 600.

Additionally, because method 600 is performed iteratively as part of dynamic profiling and compiling, when a given set of instructions is reexamined, in response the original cold target being reclassified as a new hot target and the original hot target being reclassified as a new cold target, the sorting function can perform another instance of method 600 to swap the new order of the new cold target and the new hot target in the instruction cache relative to one another (returning to the original order) and reverse the routing condition (to the original routing condition) in the branching instruction 520. Additionally, in some embodiments, if block 660 were performed, the sorting function removes any inserted jump instruction 550 before swapping the order of the new cold target and the new hot target.

Figure 7:
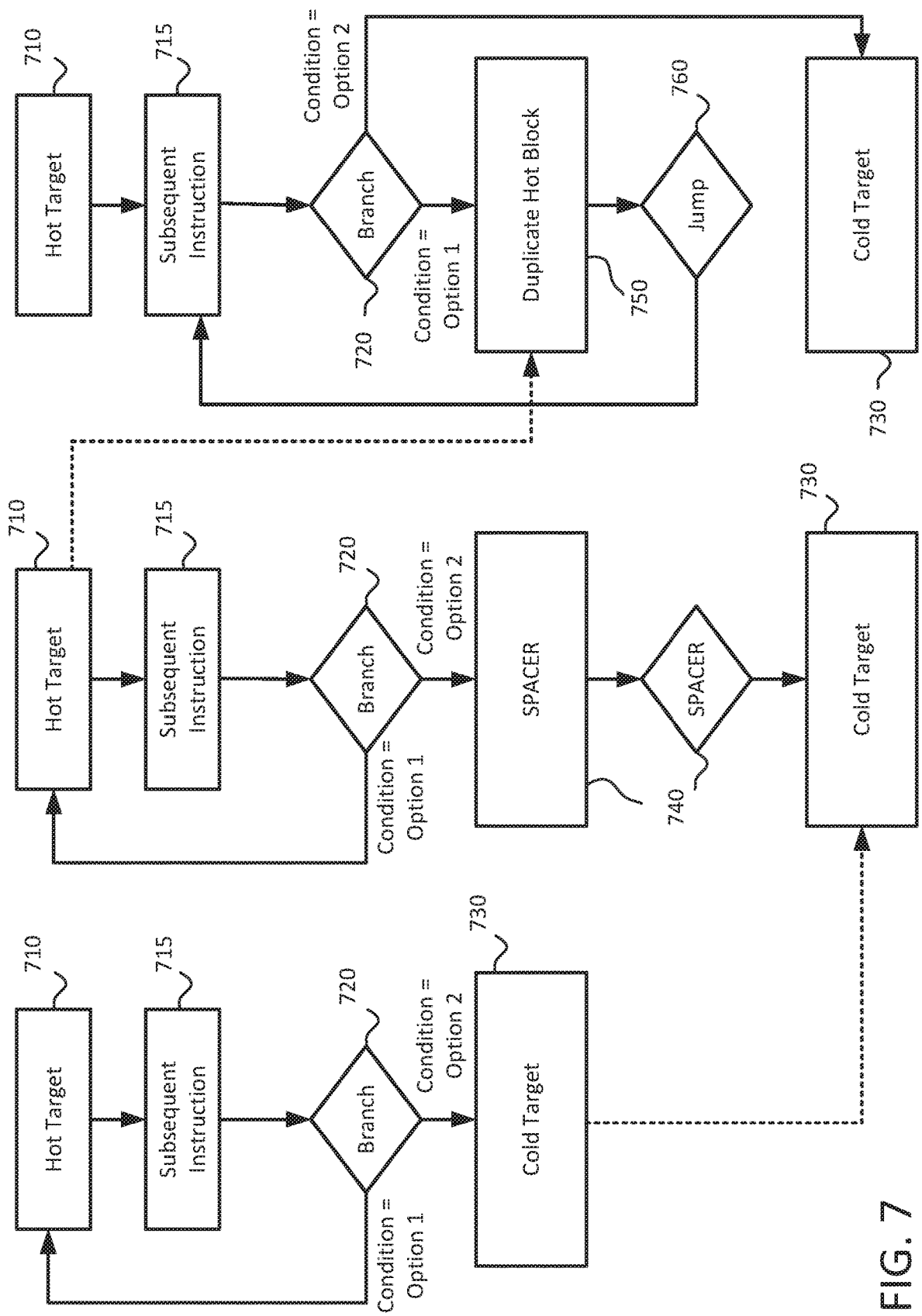
FIG. 7 illustrates backward-branch rearrangement, according to embodiments of the present disclosure.
Figure 8:
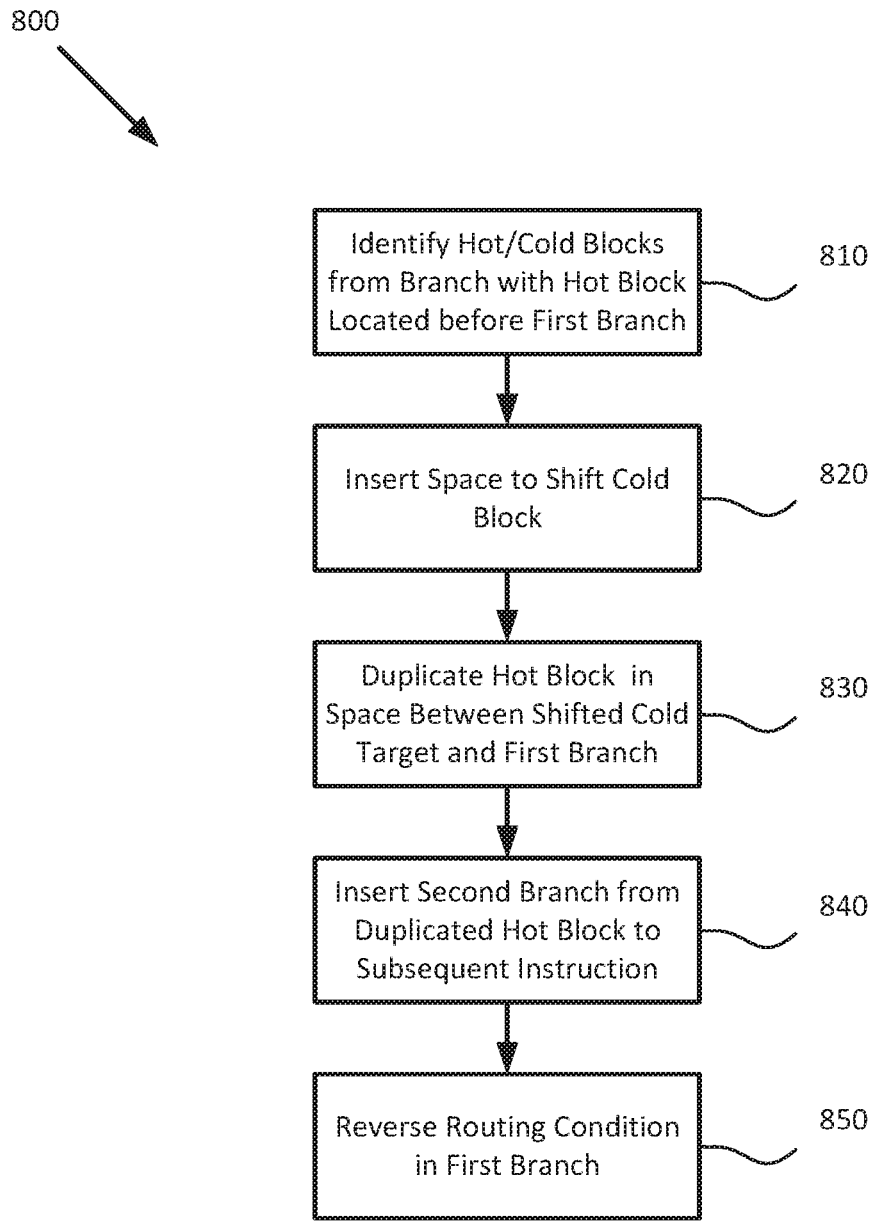
FIG. 8 is a flowchart of a method for backward-branch rearrangement, according to embodiments of the present disclosure.

FIG. 7 illustrates implementation of a method 800, shown as a flowchart in FIG. 8, for backward-branch rearrangement, according to embodiments of the present disclosure. In backward-branch rearrangement, a hot target 710 is located earlier in the instruction cache than the branching instruction 720 and the cold target 730 is located later in the instruction cache, and the branching instruction 720 initially flows to the cold target 730 and jumps to the hot target 710. The hot target 710, in turn, flows to a subsequent instruction 715. In various embodiments, the hot target 710, the subsequent instruction 715, and the branching instruction 720 are part of the same code block 320, which can include one or more additional instructions that flow from the subsequent instruction 715 to the branching instruction 720. In some embodiments, the hot target 710 is located in a different code block 320 from the branching instruction 720 and several additional instructions in one or more intermediate code blocks are located between the subsequent instruction 715 and the branching instruction 720. Additionally, the cold target 730 and the hot target 710 represent addresses or lines in the instruction cache and can be associated with additional instructions in a code block 320 that are not illustrated in FIG. 7.

Method 800 begins at block 810, where the sorting function identifies which of the blocks targeted by a first branching instruction 720 include the hot target 710 and the cold target 730 where the hot block is located before the first branching instruction 720 in the instruction cache. At block 820, the sorting function inserts a space 740 into the instruction cache to shift the cold block (and any subsequent code blocks 320) to later addresses in the instruction cache. The space 740 is sized based on the size of the hot block (e.g., the hot target 710 and any additional instructions between the hot target and the subsequent instruction 715 and an additional instruction to jump execution to a new location in the instruction cache.

At block 830, the sorting function duplicates the hot block in the space 740 made between the branching instruction 720 and the cold target 730. The duplicate hot block 750 includes a copy of the hot target 710 and any other instructions located between the hot target 710 and the subsequent instruction 715. At block 840, the sorting function creates a jump instruction 760 following the duplicate hot block 750 in the space 740. The jump instruction 760 jumps to the subsequent instruction 715 and does not flow to a next instruction in the instruction cache.

At block 840, the sorting function reverses the routing condition in the first branching instruction 720 to route execution to the duplicate hot block 750 and the cold target 730 at the new address. For example, when the execution of the first branching instruction 720 originally jumps to the hot target 710 when the routing condition is a true and originally flows to the cold target 730 when the routing condition is false, reversing the routing condition causes the first branching instruction 720 to jump to the cold target 730 when the routing condition is a true and flow to the duplicate hot block 750 when the routing condition is false. Similarly, when the execution of the first branching instruction 720 originally jumps to the hot target 710 when the routing condition is a false and originally flows to the cold target 730 when the routing condition is true, reversing the routing condition causes the first branching instruction 720 to jump to the cold target 730 when the routing condition is a false and flow to the duplicate hot block 750 when the routing condition is true. Method 800 may then conclude.

Because method 800 is performed atomically for each first branching instruction 720, after an instance of method 800 concludes, the sorting function can perform method 800 again on a different branching instruction with different hot and cold targets identified from the hot path 330, perform method 600 (discussed in relation to FIGS. 5 and 6) on a different branching instruction with different hot and cold targets identified from the hot path 330, or may conclude. In some embodiments, the first branching instruction 720 selected for a next iteration of method 800 (or an iteration of method 600) is the duplicate hot block 750 from a current iteration of method 800. Additionally, because other iterations of method 600 or method 800 may further adjust where individual code blocks 320 are located relative to one another, in some embodiments, intermediate instruction blocks may be located between the jump instruction 760 and the cold target 730.

Additionally, because method 800 is performed iteratively as part of dynamic profiling and compiling, when a given set of instructions is reexamined, in response the original cold target being reclassified as a new hot target and the original hot target being reclassified as a new cold target, the sorting function can perform another instance of method 800 to remove the duplicate hot block 750 and the jump condition 760 and reverse the routing condition (to the original routing condition) in the branch 720.

Figure 9:
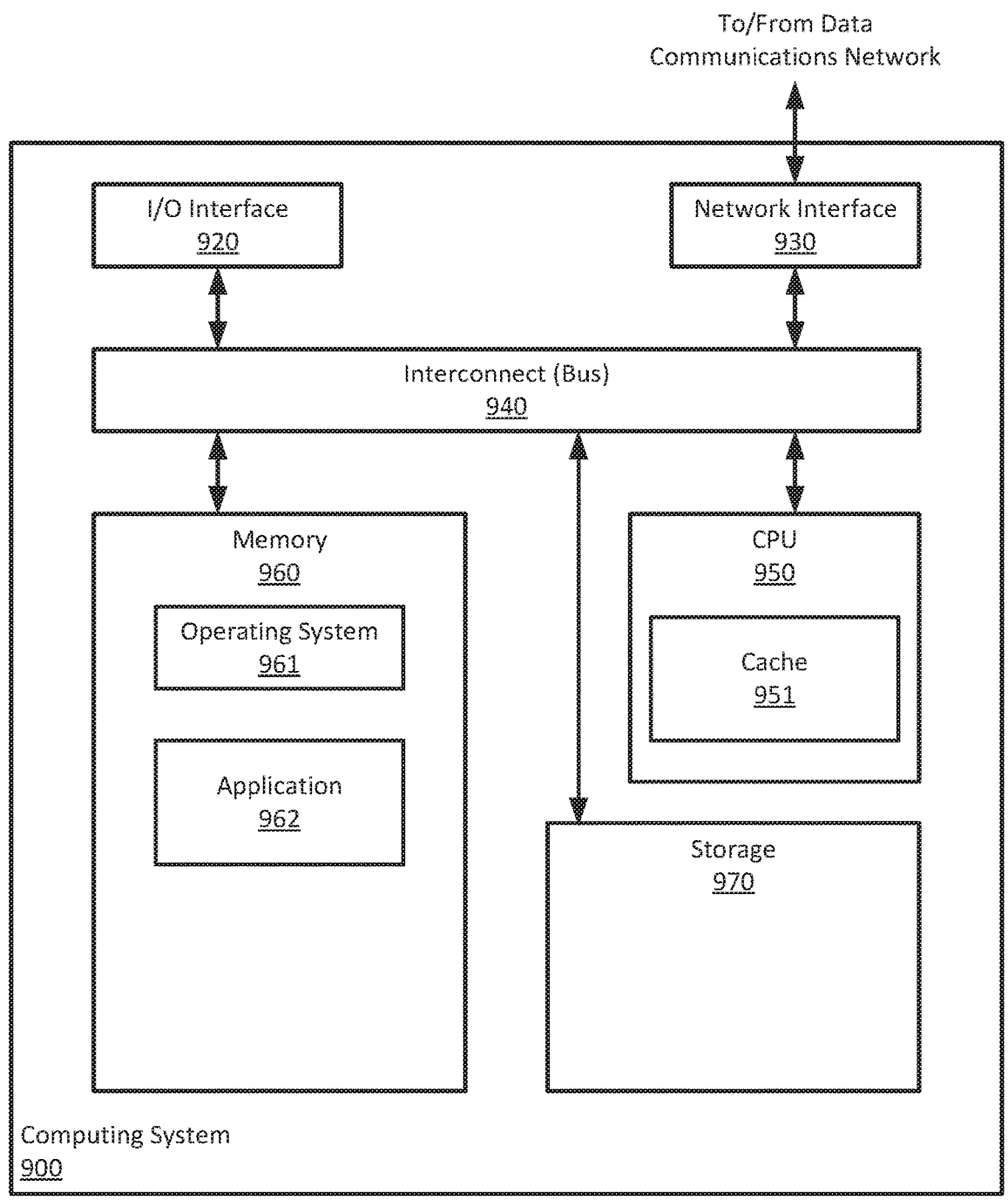
FIG. 9 illustrates a computing system, according to embodiments of the present disclosure.

FIG. 9 illustrates a computing system 900, according to embodiments of the present disclosure. As shown, the computing system 900 includes, without limitation, a central processing unit (CPU) 950, a network interface 930, an interconnect 940, a memory 960, and storage 970. The computing system 900 may also include an I/O device interface 920 connecting I/O devices 910 (e.g., keyboard, keypad, display, touchscreen, biometric scanner, and mouse devices) to the computing system 900.

The CPU 950 retrieves and executes programming instructions stored in the memory 960. Similarly, the CPU 950 stores and retrieves application data residing in the memory 960. These instructions are included in an instruction cache 951 for execution and manipulation as described in the present disclosure. The interconnect 940 facilitates transmission, such as of programming instructions and application data, between the CPU 950, I/O device interface 920, storage 970, network interface or other interconnect 940, and memory 960. CPU 950 is included to be representative of a single CPU, a microprocessor, multiple CPUs, a single CPU having multiple processing cores, and the like. And the memory 960 is generally included to be representative of a random access memory. The storage 970 may be a disk drive storage device. Although shown as a single unit, the storage 970 may be a combination of fixed and/or removable storage devices, such as magnetic disk drives, flash drives, removable memory cards or optical storage, network attached storage (NAS), or a storage area-network (SAN). The storage 970 may include both local storage devices and remote storage devices accessible via the network interface 930 (e.g., cloud storage).

Further, although shown as a single computing system, one of ordinary skill in the art will recognized that the components of the computing system 900 shown in FIG. 9 may be distributed across multiple computing systems connected by a data communications network.

As illustrated, the memory 960 includes an operating system 961, which may include one or more file systems, and a set of processor instructions to perform various actions as described herein. These actions may be informed and formatted according to various applications 962 running in the memory as instructions executed by the CPU 950.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
identifying a branching instruction associated with:
an origin instruction;
a cold target; and
a hot target located after the cold target in an instruction cache, wherein, based on historical data, the branching instruction is more likely to proceed to the hot target than to the cold target at execution based on a routing condition;
modifying contents of the instruction cache by swapping an order of the cold target and the hot target in the instruction cache;
modifying logic for the branching instruction by reversing the routing condition; and
executing the hot target in the instruction cache, prior to the cold target, based on the modified contents of the instruction cache and the modified logic for the branching instruction.

2. The computer-implemented method of claim 1, further comprising:
in response to determining that the cold target flows to the hot target at execution, inserting a jump instruction from to the hot target in the instruction cache after the cold target.

3. The computer-implemented method of claim 1, wherein execution of the branching instruction originally jumps to the hot target when the routing condition is a first one of true or false and originally flows to the cold target when the routing condition is a second one of true or false; and
wherein after swapping the order and reversing the routing condition, the execution of the branching instruction jumps to the cold target when the routing condition is the second one of true or false and flows to the hot target when the routing condition is the first one of true or false.

4. The computer-implemented method of claim 1, further comprising after swapping the order of the cold target and the hot target in the instruction cache and reversing the routing condition:
executing instructions held in the instruction cache;
continuously monitoring execution of the instructions held in the instruction cache;
in response to determining that the branching instruction is more likely to proceed to the cold target than the hot target:
reclassifying the cold target as a new hot target;
reclassifying the hot target as a new cold target;
swapping a new order of the new cold target and the new hot target in the instruction cache; and
reversing the routing condition.

5. The computer-implemented method of claim 1, wherein identifying the branching instruction further comprises determining that a difference in likelihood of proceeding to the hot target than to the cold target exceeds a user defined threshold.

6. The computer-implemented method of claim 1, wherein the hot target is a first instruction in a hot block and the cold target is a first instruction in a cold block, wherein the cold target is initially located at a first address located in the instruction cache directly after a branch address where the branching instruction is located in the instruction cache, and wherein swapping the order of the cold target and the hot target in the instruction cache further comprises:
 relocating the hot block in the instruction cache to begin with the hot target located at the first address; and
 relocating the cold block in the instruction cache to begin with the cold target located at a second address.

7. The computer-implemented method of claim 6, wherein the hot block and the cold block are of equal size, wherein after swapping the hot target and the cold target, the cold block begins where the hot block initially was located and the hot block begins where the cold block initially was located.

8. The computer-implemented method of claim 1, wherein the branching instruction is determined to be more likely to proceed to the hot target than to the cold target at execution based on an analysis of trace indexes of C2 generated instructions over a plurality of iterations of the C2 generated instructions.

9. A computer-implemented method, comprising:
 profiling branching instructions in an instruction cache to identify likelihoods of proceeding to a plurality of targets from the branching instructions;
 identifying a hot path in the instruction cache based on the identified likelihoods;
 modifying contents of the instruction cache by rearranging the plurality of targets relative to one another in the instruction cache;
 modifying logic for at least one of a plurality of associated branching instructions so that a first branching instruction that has a higher likelihood of proceeding to a first hot target than to a first cold target and that previously flowed to the first cold target and jumped to the first hot target instead flows to the first hot target and jumps to the first cold target; and
 executing the first hot target in the instruction cache, prior to the first cold target, based on the modified contents of the instruction cache and the modified logic for the at least one of the plurality of associated branching instructions.

10. The computer-implemented method of claim 9, wherein rearranging the plurality of targets is performed just in time for execution of instructions in the instruction cache, wherein a second branching instruction that flows to a second cold target and jumps to a second hot target remains unaffected by the rearranging so that the second branching instruction that flows to the second cold target and jumps to the second hot target based on the second branching instruction having a lower priority below a cutoff threshold for just in time execution.

11. The computer-implemented method of claim 10, wherein the first branching instruction has a higher priority for rearrangement than the second branching instruction based on a greater likelihood of the first branching instruction proceeding to the first hot target than the second branching instruction proceeding to the second hot target.

12. The computer-implemented method of claim 10, wherein the first branching instruction has a higher priority for rearrangement than the second branching instruction based on the first branching instruction occurring earlier in the instruction cache than the second branching instruction.

13. The computer-implemented method of claim 9, further comprising after rearranging the plurality of targets relative to one another:
 executing instructions held in the instruction cache;
 continuously monitoring execution of the instructions held in the instruction cache;
 in response to determining that the hot path has changed:
 re-profiling the branching instructions in an instruction cache to identify updated likelihoods of proceeding to the plurality of targets from the branching instructions; and
 rearranging the plurality of targets relative to one another and the associated branching instructions so that the first branching instruction that has a higher updated likelihood of proceeding to a first updated hot target than to a first updated cold target and that previously flowed to the first updated cold target and jumped to the first updated hot target instead flows to the first updated hot target and jumps to the first updated cold target.

14. The computer-implemented method of claim 9, wherein the first hot target is initially located after the first cold target in the instruction cache, wherein rearranging the plurality of targets relative to one another and the associated branching instructions further comprises:
 swapping an order of the first cold target and the first hot target in the instruction cache; and
 reversing a routing condition of the first branching instruction to jump to the first cold target and flow to the first hot target.

15. The computer-implemented method of claim 14, in response to determining that the first cold target flows to the first hot target at execution, duplicating the first hot target in the instruction cache after the swapped first cold target.

16. A system, comprising:
 a processor, including an instruction cache;
 a memory including instructions that when executed by the processor perform an operation comprising:
 profiling branching instructions in the instruction cache to identify likelihoods of proceeding to a plurality of targets from the branching instructions;
 identifying a hot path in the instruction cache based on the identified likelihoods;
 modifying contents of the instruction cache by rearranging the plurality of targets relative to one another in the instruction cache;
 modifying logic for at least one of a plurality of associated branching instructions so that a first branching instruction that has a higher likelihood of proceeding to a first hot target than to a first cold target and that previously flowed to the first cold target and jumped to the first hot target instead flows to the first hot target and jumps to the first cold target; and
 executing the first hot target in the instruction cache, prior to the first cold target, based on the modified contents of the instruction cache and the modified logic for the at least one of the plurality of associated branching instructions.

17. The system of claim 16, wherein the first hot target is initially located after the first cold target in the instruction cache, wherein rearranging the plurality of targets relative to one another and the associated branching instructions further comprises:
 swapping an order of the first cold target and the first hot target in the instruction cache; and reversing a routing condition of the first branching instruction to jump to the first cold target and flow to the first hot target.

18. A computer-readable storage medium having computer-readable program code embodied therewith, the computer-readable program code executable by one or more computer processors to:

profile branching instructions in an instruction cache to identify likelihoods of proceeding to a plurality of targets from the branching instructions;

identify a hot path in the instruction cache based on the identified likelihoods;

modify contents of the instruction cache by rearrange the plurality of targets relative to one another in the instruction cache;

modifying logic for at least one of a plurality of associated branching instructions so that a first branching instruction that has a higher likelihood of proceeding to a first hot target than to a first cold target and that previously flowed to the first cold target and jumped to the first hot target instead flows to the first hot target and jumps to the first cold target; and executing the first hot target in the instruction cache, prior to the first cold target, based on the modified contents of the instruction cache and the modified logic for the at least one of the plurality of associated branching instructions.

\* \* \* \* \*